(12) United States Patent
Schuerings et al.

(10) Patent No.: US 11,423,040 B2
(45) Date of Patent: Aug. 23, 2022

(54) USE OF FILES FOR EFFICIENT ANALYSIS AND STORAGE OF TIME-SERIES

(71) Applicant: SAP SE, Walldorf (DE)

(72) Inventors: Christian Schuerings, Düsseldorf (DE); Ralf Schoenfeld, Tettnang (DE); Florian Weigold, Bensheim (DE)

(73) Assignee: SAP SE, Walldorf (DE)

( * ) Notice: Subject to any disclaimer, the term of this patent is extended or adjusted under 35 U.S.C. 154(b) by 72 days.

(21) Appl. No.: 16/867,463

(22) Filed: May 5, 2020

(65) Prior Publication Data

US 2021/0349898 A1 Nov. 11, 2021

(51) Int. Cl.
*G06F 16/2458* (2019.01)
*G06F 16/242* (2019.01)
*G06F 16/182* (2019.01)
*G06F 16/16* (2019.01)
*G06F 16/2453* (2019.01)

(52) U.S. Cl.
CPC ........ *G06F 16/2477* (2019.01); *G06F 16/164* (2019.01); *G06F 16/182* (2019.01); *G06F 16/242* (2019.01); *G06F 16/24539* (2019.01)

(58) Field of Classification Search
CPC .............. G06F 16/2477; G06F 16/182; G06F 16/24539; G06F 16/242; G06F 16/164
See application file for complete search history.

(56) References Cited

U.S. PATENT DOCUMENTS

| 5,187,750 A * | 2/1993 | Behera .................. G06Q 40/02 382/140 |
| 10,984,044 B1 * | 4/2021 | Batsakis ............... G06F 3/0656 |
| 2008/0091749 A1 * | 4/2008 | Kitamaru ................ G06F 16/58 |
| 2018/0089286 A1 * | 3/2018 | Marquardt ............ G06F 16/248 |

\* cited by examiner

*Primary Examiner* — Cam Y T Truong
(74) *Attorney, Agent, or Firm* — Mintz Levin Cohn Ferris Glovsky and Popeo, P.C.

(57) ABSTRACT

An approach to time-series data handling involves use of a logical data file structure within a multi-layer file storage. Client systems may ingest time-series data to this logical data file structure by writing or appending the time-series data to at least one file in the logical data file structure and adding metadata describing contents of the at least one file to a metadata catalog. Related apparatus, systems, techniques and articles are also described.

20 Claims, 5 Drawing Sheets

USE OF FILES FOR EFFICIENT ANALYSIS AND STORAGE OF TIME-SERIES

TECHNICAL FIELD

The subject matter described herein relates to storage of time-series data in a database management system.

BACKGROUND

Traditional relational database management systems (RDMS) as well as non-relational (e.g., NoSQL) databases are generally not suitable for handling large quantities of time-series data efficiently. On the one hand side they do not scale linearly with more data, on the other hand side they often have a proprietary or cumbersome interface for processing and analysis of the data. In addition, database systems tend to require an expensive server infrastructure.

Decisions regarding which type of system to use for handling a given type of data usually involve a trade-off between cost and performance. For example, running an in-memory time-series database may be fast, as system memory access is significantly faster than disk, albeit much more expensive. Additionally, as a dataset grows in size, it will eventually not fit entirely in memory or on even local disk storage. Object storages like AWS S3, GCP GCS or Apache HDFS are designated for these large datasets.

Time-series data is characterized by immutability (measurements are generally not changed once created—new data are typically appended rather than previous data overwritten), importance (time-series data tracks changes over time, but not all periods are of equal importance—recent data are typically more useful for actions, whereas older data may be relevant for analysis), volume (time-series data tend to be high volume data which results in high costs), and seasonality (time-series data tends to be seasonal with repeating patterns).

SUMMARY

In some aspects of the current subject matter relating to time-series data handling, a client implemented on one or more processors processes time-series data received from a time-series data source. This processing includes writing or appending the time-series data to at least one file in a logical data file structure. The client also adds metadata describing contents of the at least one file to a metadata catalog. For data retrieval, e.g., in response to a query received by the client, the client accesses the metadata catalog, which includes determining one or more locations of data available for responding to the query, and then retrieves data from the one or more locations for responding to the query.

Non-transitory computer program products (i.e., physically embodied computer program products) are also described that store instructions, which when executed by one or more data processors of one or more computing systems, cause at least one data processor to perform one or more of the operations described herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter relates to a more efficient manner for storing time-series data within a database management system. Benefits, which are discussed in further detail below, may be achieved by storing data grouped files in a multi-layer file storage that includes a logical data file structure while also storing metadata relating to the stored data in a metadata catalog. Stored time-series data may be retrieved by reading metadata from the metadata catalog and accessing the appropriate files from the logical data file structure based on the metadata.

Figure 1:
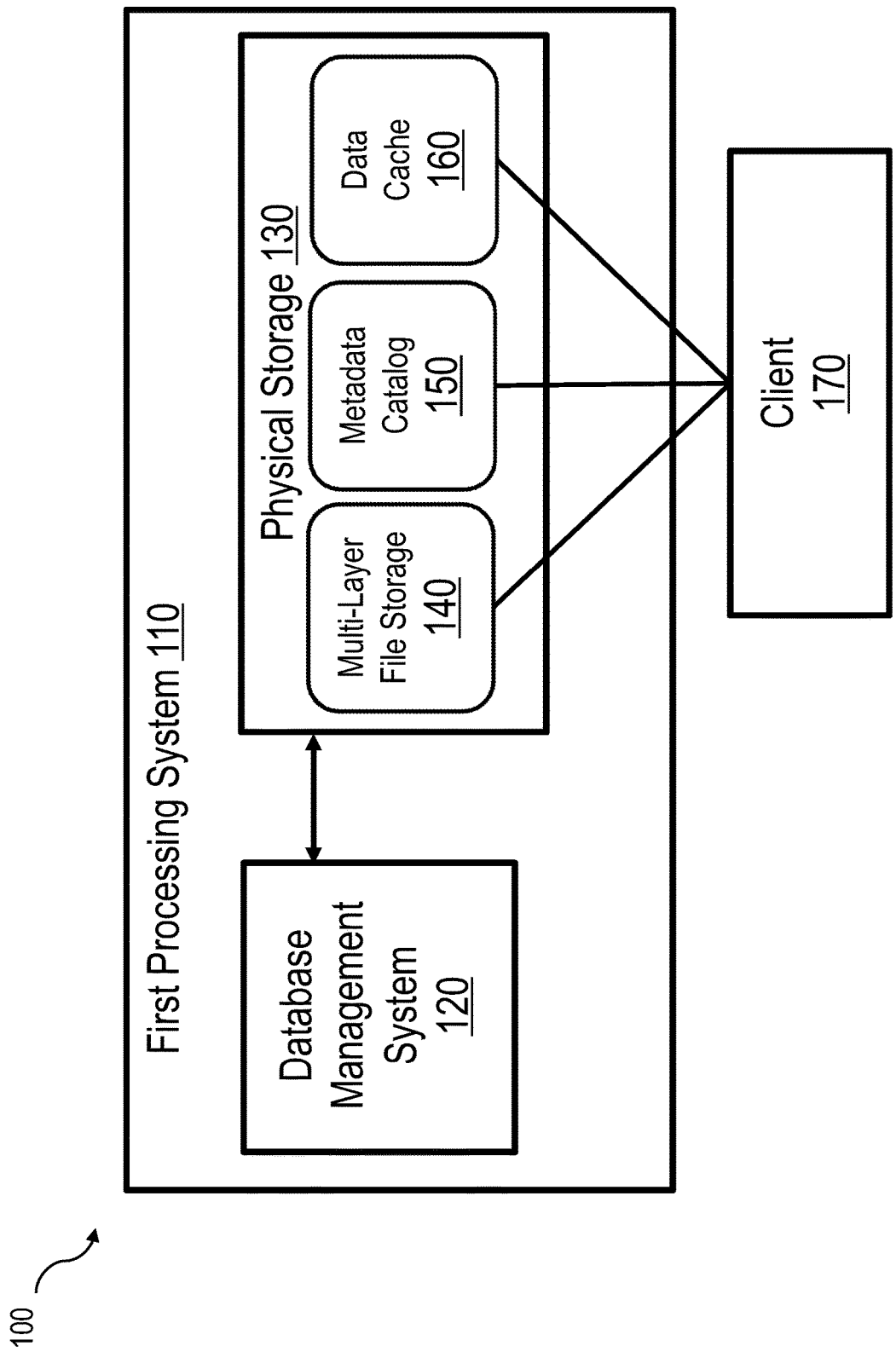
FIG. 1 shows a block diagram illustrating components of a computing arrangement consistent with aspects of the current subject matter.

FIG. 1 shows a block diagram illustrating interaction of hardware components in a computing arrangement 100 capable of implementing one or more aspects of the current subject matter. A first processing system 110 in the computing arrangement 100 includes one or multiple computing devices including one or multiple physical processors, and may optionally be implemented as a single localized computing system, a distributed computing system, a cloud computing system, or the like, or optionally may include characteristics of more than one of such approaches. In any implementation, this first processing system executes software or otherwise provides functionality of a database management system (DBMS) 120. The database management system 120 may be one that stores data on a physical storage 130 (e.g., on disk, in memory, on some other storage medium, or any combination thereof). Alternatively or in addition, the database management system 120 can manage database access to data stored on other systems that include one or multiple physical storages 130, optionally including a mixture of different physical storage types. The database management system may include a columnar data store, a row-based data store, or the like, and may include relational and/or non-relational database capabilities. The computing arrangement also includes a multi-layer file storage 140, a metadata catalog 150, and, optionally a data cache 160. The multi-layer file storage 140, metadata catalog 150, and/or data cache 160 can optionally be implemented on the same storage device or devices that contains the database storage 130, on another storage device or devices, or some combination thereof. Any of the storage devices referred to above can optionally be part of the first processing system 110 or some other system or systems that are accessible by the first processing system 110.

The computing arrangement 100 also includes client functionality consistent with the descriptions below. The client functionality can be implemented on one or more client computing systems 170 as shown in FIG. 1, or alternatively on the first computing system 110 that also provides the database management system functionality. A client computing system 170 consistent with the current disclosure includes a processor and memory as well as communications hardware sufficient to communicate with the first computing system. The first computing system 110 also includes such communications hardware, which can include a network connection (e.g., local area network, wide area network, the Internet, or some combination thereof) and/or some other non-networked connection (e.g., via a serial or parallel bus, USB, or the like). For the purposes of streamlining the following description, the term "client 170" generally refers to a client computing system as described above implementing client functionality (e.g., by some combination of hardware executing machine instructions.

As discussed in further detail below, implementations of the current subject matter may provide decentralized capabilities via which one or more clients 170 may leverage local computing power, memory, input/output capabilities, and the like to efficiently handle storage and retrieval of time series data in a linearly scalable manner. Read performance scaling may be accomplished by adding additional clients 170, and can therefore be linear. The current subject matter also allows instances to run in a server-client arrangement. A time-series storage approach consistent with the current disclosure may be based on common standards such that raw data access to the time-series data store is also possible. The time-series data can be completely stored in an object storage or disk where it may be compressed. Such an approach may result in a cost-efficient representation, which can be especially important given the high volume of the data typically associated with time-series data. Rather than the actual time-series data being stored in the database management system, only the necessary metadata for accessing the files containing the time-series data need to be accessible from the database.

An approach consistent with the current subject matter may be capable of handling homogeneous as well as non-homogeneous time-series data. Homogeneous time-series data are data in which the data entries such as sensor readings from multiple sensors are stored at similar time values, while heterogeneous time-series data include data entries stored at disparate time values. While it may be more efficient to store homogeneous data, for example because the data from several different sensors can be stored with a single time value in a single file, non-homogeneous data can optionally be represented with labels (e.g., a discussed below). Time-series data can also be split into different files and/or parts of the file storage structure 140 by frequency (e.g. all properties with 1 Hz and all properties with 100 Hz).

Time-series data has a key property of having a time axis. A logical data file structure for use in a multi-layer file storage 140 consistent with the current subject matter may be based on a folder structure for storing the files. This folder structure may be created logically along the time axis in the required level of detail, such as for example year/month/day/hour/minute. The files may be regularly merged (e.g., as discussed below in reference to data governance), which may optionally result in reducing the level of detail. For example, files from a year/month/day/hour based folder structure may be merged to the structure year/month/day by combining multiple hourly files to one daily file. This merging provides benefits in alleviating potential issues with large numbers of small files (e.g., because reading/writing a lot of files may become slow and inefficient). A time-series is per se one dimensional panel data, with the point-in-time being the main identifier. If other identifiers are present for labelling the time-series and its hierarchy, the folder structure can be extended to also this represent this structure. For example: label-parent/label/year/month . . . while arbitrary levels of hierarchies are supported. The labels are then also stored in the metadata catalog 150 to facilitate data retrieval.

With this folder structure a multi-layering may be achieved, so that the system can determine a fastest path for data retrieval. Queries which target a small timeframe may be resolved by using the lowest level available (e.g. year/month/day/hour/minute), whereas a query for a larger timeframe uses the bigger files on a higher layer (e.g. year/month). With this the I/O between the system and the file storage used may be optimized.

Using a data retrieval interface consistent with implementations of the current subject matter, a system can integrate well with existing data science solutions while allowing a seamless transition to a productive integration. No change of environments is required, which may improve verifiability and development speed.

As discussed further below, access to the time-series data itself may be supported by a metadata catalog 150, which provides a directory of all written files in the different layers of the logical file data structure in the multi-layer file storage 140 and their corresponding information like timeframe and labels, as discussed above. Such features may enable reducing retrieval and file accesses significantly. Together with features of the file format (parquet) like, e.g. file partitioning, column selection and row groups it is even possible to access only parts of the file.

Additionally, a data cache 160 as described herein may be leveraged to speed up the retrieval of time-series data, which can be beneficial. Recent data or pre-calculated aggregates are typically used for end-user visualizations, which can benefit from lower latency performance than may be possible with an additional data request roundtrip to the object storage or local storage.

Figure 2:
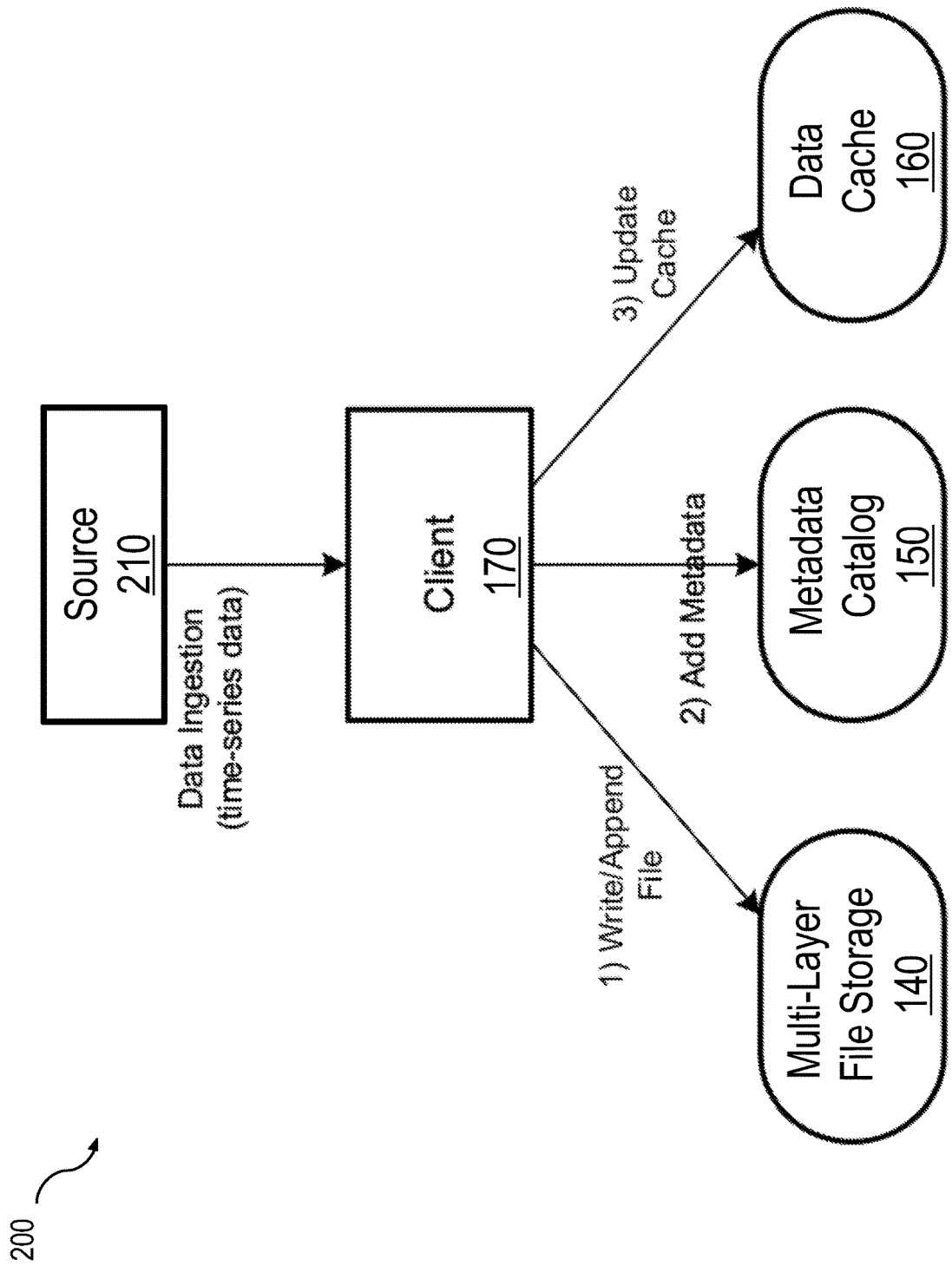
FIG. 2 shows a block diagram illustrating features of a time-series data ingestion process consistent with aspects of the current subject matter

FIG. 2 shows a block diagram conceptually illustrating some aspects of data ingestion processes 200 consistent with implementations of the current subject matter. During data ingestion, time-series data are received by the client 170 from a time-series data source 210. The time-series data source 210 can be, for example one or more sensors or other time-series data generators, an Internet of Things (IoT) gateway that receives and organizes such data, or the like. The client writes or appends the received time-series data to files in a multi-layer file storage 140 using a logical data file structure as described above. The client 170 also adds metadata describing contents of the files (such as, for example, one or more of a timeframe of the time-series data included in the file, the file location, labels for cross-sectional data, etc.) to the metadata catalog 150. Recent time-series data may also be written to the data cache 160. After this transaction is completed, the time-series data are available for data retrieval.

Figure 3:
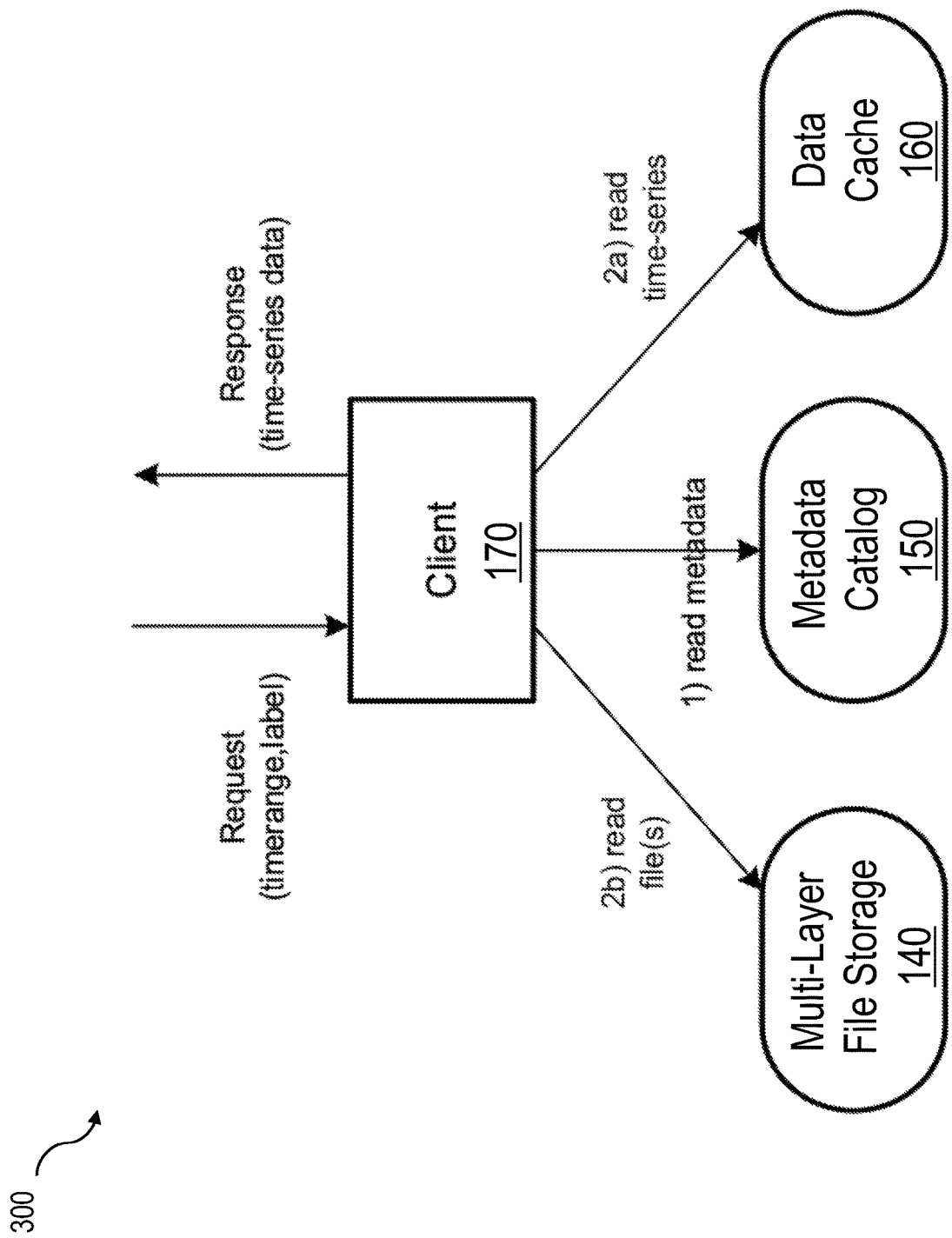
FIG. 3 shows a block diagram illustrating features of a time-series data retrieval process consistent with aspects of the current subject matter

FIG. 3 shows a block diagram conceptually illustrating some aspects of data retrieval processes 300 consistent with implementations of the current subject matter. During data retrieval, for example when the client 170 receives a request to retrieve some part of the time-series data, the client 170 accesses the metadata catalog to determine, for example via a lookup process, which metadata are available for the query. The client 170 can then determine whether time-series data currently held in the data cache 160 may be used to respond to the query. If not (e.g., because the query requests time-series data that were not identified as sufficiently recent or high value to be held in the data cache 160), the client 170 determines, based on metadata from the metadata catalog 150, which files in the multi-layer storage of the multi-layer file storage 140 are consistent with a timeframe and label consistent with a response to the query. The client 170 can either work with the identified files directly within the file storage 140, or optionally read data from the identified files back into the database structure for use in retrieving the time-series data in a uniform manner.

Figure 4:
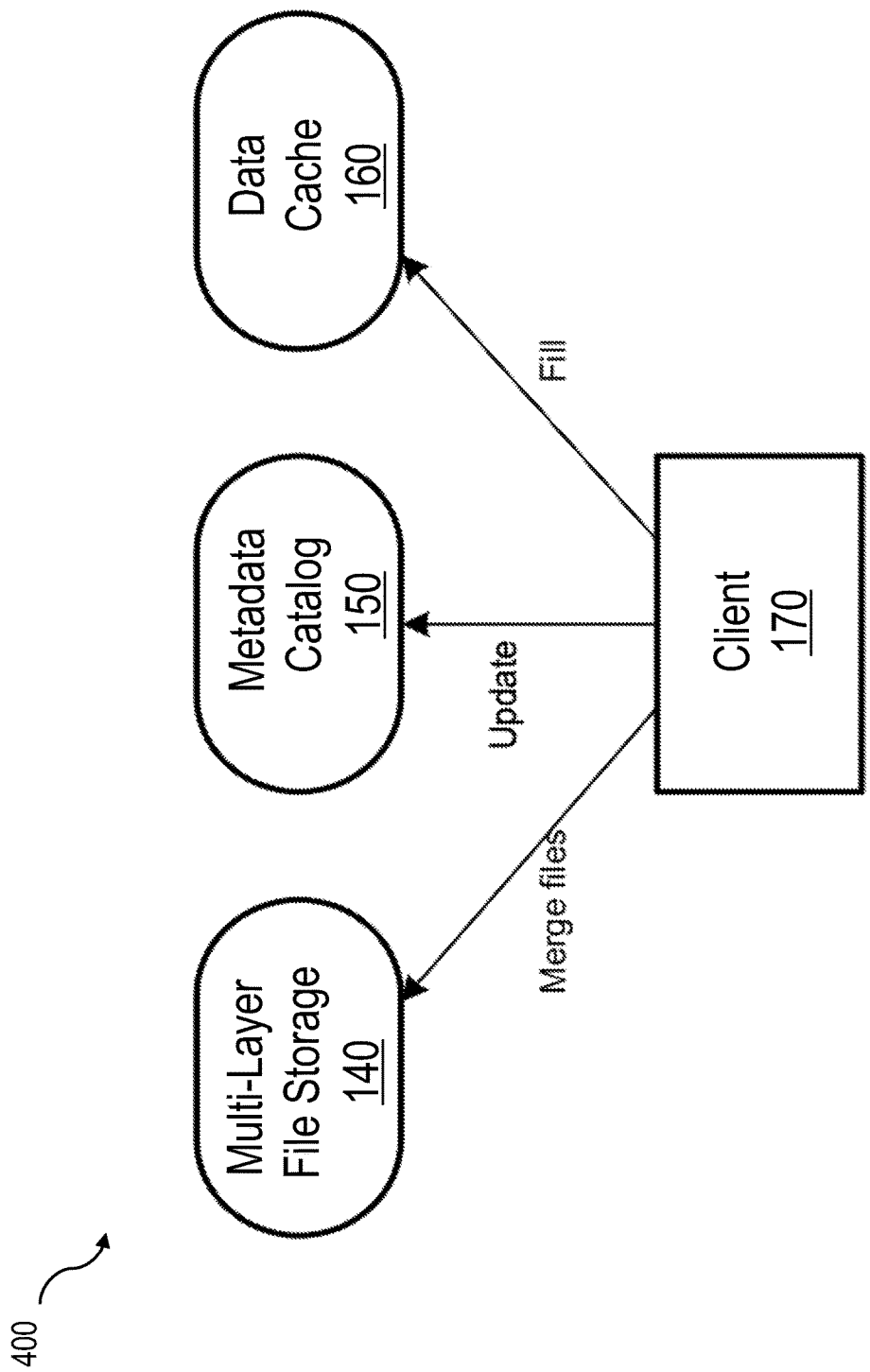
FIG. 4 shows a block diagram illustrating features of a time-series data governance process consistent with aspects of the current subject matter

FIG. 4 shows a block diagram conceptually illustrating some aspects of data governance processes 400 consistent with implementations of the current subject matter. As part of data governance, approaches consistent with the current subject matter may be configured to automatically merge files in the multi-layer file storage 140 to larger time-series buckets while deleting the smaller buckets keeping the number of files and metadata reasonably small. In practice, this approach can include merging one or more files in the multi-layer file storage 140 into a larger file such that a smaller amount of metadata (e.g., a start time, an end time or a duration of time, a label or perhaps one or more data sources such as sensors, etc.) are required to identify the larger file than the two smaller files. As noted above, based on configuration, more recent data can be kept in a data cache 160 and periodically written to files in the multi-layer file storage 140 (with accompanying writes to the metadata catalog 150) to free up space in the data cache 160 for more recent time-series data. Data de-duplication can also be performed concurrently with the data governance processes, for example via elimination of duplicate data entries during the merging process.

Implementations of the current subject matter may also include functionality to precompute aggregates for the time-series data and store the aggregates in the same multi-layer file storage 140 and/or in the data cache 160. Such data aggregates may be useful, for example, in supporting the visual analysis of high-volume time-series data through the usage of algorithms like the M4 algorithm (available from SAP SE of Walldorf, Germany).

As noted above, implementations of the current subject matter may also be used in conjunction with a scalable approach, for example one in which multiple clients 170 access a single multi-layer file storage 140 and metadata catalog 150. Alternatively, different clients 170 can be assigned to different multi-layer file storage 140 with a common metadata catalog 150 that stores file paths for the files containing time-series data stored in each of the file storages of the multiple clients 170. Such a capability allows the aforementioned linear scaling of data handling capacities.

Figure 5:
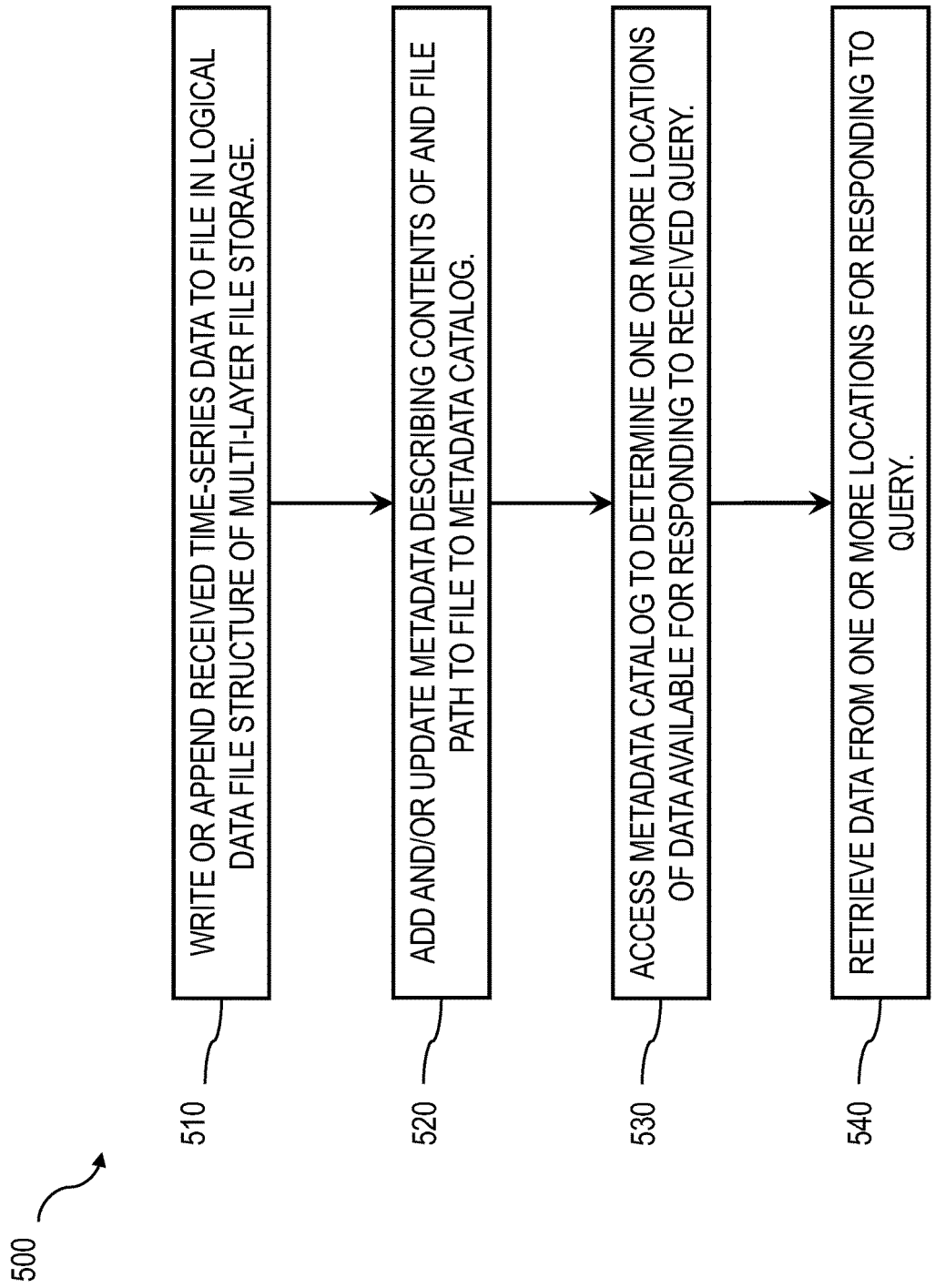
FIG. 5 shows a process flow diagram illustrating features of a files-based time-series data storage approach according to some aspects of the current subject matter.

FIG. 5 shows a process flow diagram 500 illustrating features of a method consistent with implementations of the current subject matter. At 510, a client implemented on one or more processors processes time-series data received from a time-series data source. The processing includes writing or appending the time-series data to at least one file in a logical data file structure within a multi-layer file storage 140. As noted above, the logical file structure includes files arranged in an ordered manner with multilevel groupings according to the time axis that the time-series data are collected along and/or a time-series data source from which the time-series data originate. In a non-limiting example, a upper level of the file path may be a series of folders or the like with a folder for each sensor label, a next level in each such folder may be a series of folders for each calendar year, a next level may be calendar months, then days, then hours, etc. Optionally, the client may write at least some of the received time-series data to a data cache 160 as discussed above.

At 520, the client adds and/or updates metadata describing contents of and a file path to the (at least one) file to a metadata catalog 150. In the non-limiting example above, a given file created to contain data collected by sensor A during the hour of 3-4 AM on April 20 of the year 2020 may be designated in the metadata catalog with a file path of A/2020/April/20/0300. In optional examples, the metadata added to the metadata catalog 150 may include one or more of a timeframe of the time-series data included in the file, a file location, and a labels for cross-sectional data.

In the case of a data cache 160, the client may access the at least some of the received time-series data written to the data cache 160, merge the at least some of the received time-series to create a new file or append to an existing file in the logical data file structure of the multi-layer file storage 140, and update the metadata catalog 150 to correspond to a location and/or contents of the new file or appended existing file.

At 530, the client, in response to a request to retrieve a part of the time-series data to respond to a query, accesses the metadata catalog 150 at least to determine one or more locations of data available for responding to the query. The one or more locations of data available for responding to the query may optionally include the data cache 160.

At 540 the client retrieves data from the one or more locations (e.g., in the multi-layer file storage 140 and/or in the data cache 160) for responding to the query.

In further optional aspects of the current subject matter, a second client implemented on one or more processors may process second time-series data received from a second time-series data source, where the processing includes writing or appending the time-series data to at least one second file in the logical data file structure of a multi-layer file storage 140. Such functions can support scalability in that multiple clients may be implemented to handle more data sources. These extra clients may also handle parallel retrieval requests and/or parallel merge operations as part of data governance consistent with the descriptions of such features provided above.

As discussed above in relation to data governance, the client may also access a plurality of files in the multi-layer file storage 140 and/or data from the data cache 160, merge the files to create a smaller number of files containing data from the plurality of files or an aggregation of the data from the plurality of files, store the smaller number of files in the file storage, and update the metadata catalog 160 to reflect the contents of the smaller number of files.

Although a few variations have been described in detail above, other modifications or additions are possible. In some examples, no database management system is necessary. Instead, a client 170 may directly access needed files from the multi-layer file storage 140 based on the folder structure.

In this non-limiting example, the logical data file structure (which can optionally be any kind of hierarchical file structure such as a folder structure) may be broken down with a upper level folder label designating a particular sensor or other data source, a next lower level folder label designating a specific year, a next lower level folder label designating a month, a lower next level folder label designating a day, and a next lower level folder label designating an hour. Additional labels stored in the metadata catalog 150 may reflect one or more type of additional information, such as for example by indicating files that contain aggregated data, information about a time structure of the data stored in a given file or in multiple files within a folder (e.g., the periodicity of the data such a 1 Hz, 100 Hz, etc.).

Alternatively or in addition, labels may indicate that data from multiple sources are combined in a single part of the logical file data structure, or any other identifying information that assists in data storage and retrieval. In an example implementation that omits the database management system features, the client 170 can directly traverse the logical file data structure in the multi-layer file storage 140 with assistance from metadata accessed from the metadata catalog 150. Information from the metadata catalog 150 can assist in avoiding unnecessary file queries, for example by indicating where files have been merged, where aggregations have been created and stored, etc.

In another implementation example, the metadata catalog 150 can be implemented as part of a database management system 120, which may provide more powerful lookup and data aggregation features. For example, to support fast access for large or frequent data lookups, implementation of the metadata catalog 150 within a database management system 120 (e.g., SAP HANA available from SAP SE of Walldorf, Germany) can be useful in enabling direct file lookup, such as by storing the folder tree information more directly such that the client may access (for example) data from a given sensor for a given hour at a given sampling periodicity without needing to traverse the folder structure from the top down.

The subject matter described herein provides many technical advantages. For example, in some implementations of the current subject matter, it is not necessary to maintain an underlying database log for the sensor data itself. Instead it can be possible to rely only on the logging and locking mechanism within the metadata catalog (150). The data governance process described above may handle data quality aspects, such as, for example, de-duplication for sensor data within a given timeframe. Also, due to the openness and flexibility of blending storage technologies, monolithic database software is not required for operation of a system implemented as described herein. Instead, a more distributed landscape can be employed that allows independent scaling of components as required, e.g., more storage in the object store 140, or a larger in-memory store for the metadata catalog 150 to support more parallel requests. Additional clients 170 may be added to handled greater volume of data ingestion and/or data retrieval.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible. Reference to a system or the like being "configured to" perform one or more actions is intended, unless explicitly disclaimed, to be an open-ended construction, such that being configured to perform action or operations A, B, and C does not preclude also being configured to perform additional actions.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    computing hardware configured to:
        process, at a client implemented on one or more processors, time-series data received from a plurality of time-series data sources, the processing comprising deduplicating the received time-series data associated with a predetermined time-series data source in the plurality of time-series data sources collected in accordance with at least one of a predetermined timeframe for collecting time-series data by the predetermined time-series data source and a predetermined frequency for collecting time-series data by the predetermined time-series data source, and writing or appending the deduplicated time-series data to at least one file in a logical data file structure, the logical data file structure including files arranged in an ordered manner with one or more multilevel groupings according to a time axis that the time-series data are collected along and the time-series data source from which the time-series data originated, the multilevel groupings of the logical data file structure including an upper level of a file path including a first series of folders with a folder for each label, and one or more lower levels of the file path including a second series of folders for each label, the logical data file structure including a plurality of layers, the deduplicated time-series data being stored across at least a portion of the plurality of layers;
        add metadata describing contents and a file format indicating one or more formatting features of the at least one file to a metadata catalog, and precompute one or more aggregates for the deduplicated time-series data, and store the precomputed one or more aggregates in at least one of the logical data file structure and a data cache;
        access, by the client in response to a request to retrieve a data of the time-series data to respond to a query, the metadata catalog, the accessing comprising determining one or more locations of data available for responding to the query, the one or more locations of data including at least one of the logical data file structure and the data cache;
        merge at least some of the received time-series data to create a new file or append to an existing file in the logical data file structure; and
        retrieve the data of the time-series data from the logical data file structure, in accordance with a file format of the data and based on the accessed metadata catalog, from the one or more locations for responding to the query, the retrieved data including the precomputed one or more aggregates for the deduplicated time-series data.

2. The system of claim 1, wherein the computing hardware is further configured to:
    access, by the client, a plurality of files in the logical data file structure;
    store the smaller number of files in the logical data file structure; and
    update the metadata catalog to reflect contents of the smaller number of files.

3. The system of claim 1, wherein the metadata added to the metadata catalog comprises one or more timeframes of the time-series data included in the file, a file location, and labels for cross-sectional data.

4. The system of claim 1, wherein the computing hardware is further configured to: write at least some of the received time-series data to a data cache.

5. The system of claim 4, wherein the one or more locations of data available for responding to the query comprise the data cache.

6. The system of claim 4, wherein the computing hardware is further configured to:
    access, by the client, at least some of the received time-series data written to the data cache.

7. The system of claim 1, further comprising a second client comprising the computing hardware configured to:
    process, at the second client, second time-series data received from a second time-series data source, the processing comprising writing or appending the time-series data to at least one second file in the logical data file structure.

8. The system of claim 1, wherein the computing hardware comprises a physical processor and a memory storing executable instructions for execution by the physical processor.

9. A computer-implemented method comprising:
    processing, at a client implemented on one or more processors, time-series data received from a plurality of time-series data sources, the processing comprising deduplicating the received time-series data associated with a predetermined time-series data source in the plurality of time-series data sources collected in accordance with at least one of a predetermined timeframe for collecting time-series data by the predetermined time-series data source and a predetermined frequency for collecting time-series data by the predetermined time-series data source, and writing or appending the deduplicated time-series data to at least one file in a logical data file structure, the logical data file structure including files arranged in an ordered manner with one or more multilevel groupings according to a time axis that the time-series data are collected along and the time-series data source from which the time-series data originated, the multilevel groupings of the logical data file structure including an upper level of a the path including a first series of folders with a folder for each label, and one or more lower levels of the file path including a second series of folders for each label, the logical data the structure including a plurality of layers, the deduplicated time-series data being stored across at least a portion of the plurality of layers;

adding metadata describing contents and a format indicating one or more formatting features of the at least one file to a metadata catalog, and precompute one or more aggregates for the deduplicated time-series data, and store the precomputed one or more aggregates in at least one of the logical data file structure and a data cache;

accessing, by the client in response to a request to retrieve a data of the time-series data to respond to a query, the metadata catalog, the accessing comprising determining one or more locations of data available for responding to the query, the one or more locations of data including at least one of the logical data file structure and the data cache;

merging at least some of the received time-series data to create a new file or append to an existing file in the logical data file structure; and retrieving the data of the time-series data from the logical data file structure, in accordance with a file format of the data and based on the accessed metadata catalog, from the one or more locations for responding to the query, the retrieved data including the precomputed one or more aggregates for the deduplicated time-series data.

10. The computer-implemented method of claim 9, further comprising:

accessing, by the client, a plurality of files in the logical data file structure;

merging the files to create a smaller number of files containing data from the plurality of files or an aggregation of the data from the plurality of files;

storing the smaller number of files in the logical data file structure; and updating the metadata catalog to reflect contents of the smaller number of files.

11. The computer-implemented method of claim 9, wherein the metadata added to the metadata catalog comprises one or more timeframes of the time-series data included in the file, a file location, and labels for cross-sectional data.

12. The computer-implemented method of claim 9, further comprising: writing at least some of the received time-series data to a data cache.

13. The computer-implemented method of claim 12, wherein the one or more locations of data available for responding to the query comprise the data cache.

14. The computer-implemented method of claim 13, further comprising:

accessing, by the client, the at least some of the received time-series data written to the data cache.

15. The computer-implemented method of claim 9, further comprising:

processing, at a second client implemented on one or more processors, second time-series data received from a second time-series data source, the processing comprising writing or appending the time-series data to at least one second file in the logical data file structure.

16. A non-transitory computer readable medium storing computer executable instructions which, when executed by at least one data processor forming part of at least one computing system, causes the at least one data processor to perform operations comprising:

processing, at a client implemented on one or more processors, time-series data received from a plurality of time-series data sources, the processing comprising deduplicating the received time-series data associated with a predetermined time-series data source in the plurality of time-series data sources collected in accordance with at least one of a predetermined timeframe for collecting time-series data by the predetermined time-series data source and a predetermined frequency for collecting time-series data by the predetermined time-series data source, and writing or appending the deduplicated time-series data to at least one file in a logical data file structure, the logical data file structure including files arranged in an ordered manner with one or more multilevel groupings according to a time axis that the time-series data are collected along and the time-series data source from which the time-series data originated, the multilevel groupings of the logical data file structure including an upper level of a file path including a first series of folders with a folder for each label, and one or more lower levels of the file path including a second series of folders for each label, the logical data file structure including a plurality of layers, the deduplicated time-series data being stored across at least a portion of the plurality of layers;

adding metadata describing contents and a file format indicating one or more formatting features of the at least one file to a metadata catalog, and precompute one or more aggregates for the deduplicated time-series data, and store the precomputed one or more aggregates in at least one of the logical data file structure and a data cache;

accessing, by the client in response to a request to retrieve a data of the time-series data to respond to a query, the metadata catalog, the accessing comprising determining one or more locations of data available for responding to the query, the one or more locations of data including at least one of the logical data file structure and the data cache;

merging at least some of the received time-series data to create a new file or append to an existing file in the logical data file structure; and retrieving the data of the time-series data from the logical data file structure, in accordance with a file format of the data and based on the accessed metadata catalog, from the one or more locations for responding to the query, the retrieved data including the precomputed one or more aggregates for the deduplicated time-series data.

17. The non-transitory computer readable medium of claim 16, wherein the operations further comprise:

accessing, by the client, a plurality of files in the logical data file structure;

merging the files to create a smaller number of files containing data from the plurality of files or an aggregation of the data from the plurality of files;

storing the smaller number of files in the logical data file structure; and updating the metadata catalog to reflect contents of the smaller number of files.

18. The non-transitory computer readable medium of claim 16, wherein the metadata added to the metadata catalog comprises one or more timeframes of the time-series data included in the file, a file location, and labels for cross-sectional data.

19. The non-transitory computer readable medium of claim 16, wherein the operations further comprise:
   accessing, by the client, at least some of the received time-series data written to a data cache.

20. The non-transitory computer readable medium of claim 16, wherein the operations further comprise:
   processing, at a second client implemented on one or more processors, second time-series data received from a second time-series data source, the processing comprising writing or appending the time-series data to at least one second file in the logical data file structure.

* * * * *